United States Patent
Murata (10) Patent No.: US 10,508,636 B2
(45) Date of Patent: Dec. 17, 2019

(54) EXHAUST HEAT RECOVERY SYSTEM

(71) Applicant: TOYOTA JIDOSHA KABUSHIKI KAISHA, Toyota-shi (JP)

(72) Inventor: Toshio Murata, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 218 days.

(21) Appl. No.: 15/588,059

(22) Filed: May 5, 2017

(65) Prior Publication Data

US 2017/0350361 A1 Dec. 7, 2017

(30) Foreign Application Priority Data

Jun. 7, 2016 (JP) ................... 2016-113693

(51) Int. Cl.
| | |
|---|---|
| *F02N 19/10* | (2010.01) |
| *F01N 5/02* | (2006.01) |
| *F02G 5/02* | (2006.01) |
| *F01N 3/02* | (2006.01) |

(Continued)

(52) U.S. Cl.
CPC ........... *F02N 19/10* (2013.01); *F01N 3/0205* (2013.01); *F01N 5/02* (2013.01); *F01P 3/20* (2013.01); *F02G 5/02* (2013.01); *F01N 2240/02* (2013.01); *F01N 2240/36* (2013.01); *F01P 2007/146* (2013.01); *F01P 2060/16* (2013.01);

(Continued)

(58) Field of Classification Search
CPC ............. F01N 2240/02; F01N 2240/36; F01N 3/0205; F01N 5/02; F01P 2007/146; F01P 2060/16; F01P 3/20; F02G 5/02; F02N 19/10; Y02T 10/16; Y02T 10/166; Y02T 10/20
See application file for complete search history.

(56) References Cited

U.S. PATENT DOCUMENTS

| | | |
|---|---|---|
| 2003/0070427 A1 | 4/2003 | Banzhaf et al. |
| 2011/0088378 A1 | 4/2011 | Prior et al. |
| | (Continued) | |

FOREIGN PATENT DOCUMENTS

| | | |
|---|---|---|
| EP | 1 295 740 A1 | 3/2003 |
| JP | 2010007570 A * | 1/2010 |
| | (Continued) | |

OTHER PUBLICATIONS

JP 2010-007570 A English Machine Translation Attached (Year: 2010).*

*Primary Examiner* — Audrey K Bradley
*Assistant Examiner* — Anthony Ayala Delgado
(74) *Attorney, Agent, or Firm* — Oblon, McClelland, Maier & Neustadt, L.L.P.

(57) ABSTRACT

In a distribution flow path that allows engine coolant to circulate between an exhaust heat recovery unit and an engine, an upstream flow path on the upstream side of the engine and a downstream flow path on the downstream side of the engine are communicated with each other by means of a bypass flow path to thereby form a short flow path with a shorter flow path length than in a case where the engine coolant that has exited the exhaust heat recovery unit passes through the engine. A valve that can adjust the amount of the engine coolant flowing to the bypass flow path and a short flow path pump are disposed.

9 Claims, 4 Drawing Sheets

(51) Int. Cl.
*F01P 3/20* (2006.01)
*F01P 7/14* (2006.01)

(52) U.S. Cl.
CPC .............. *Y02T 10/16* (2013.01); *Y02T 10/166* (2013.01); *Y02T 10/20* (2013.01)

(56) References Cited

U.S. PATENT DOCUMENTS

2014/0352303 A1* 12/2014 Santoso ................ F01N 3/0835
                                                            60/620
2015/0218998 A1    8/2015 Ishihata et al.
2015/0233337 A1* 8/2015 Shutty .................. F02D 41/064
                                                            123/41.1
2015/0354438 A1   12/2015 Shinpo et al.

FOREIGN PATENT DOCUMENTS

| JP | 2011-236863    | 11/2011 |
| JP | 2015-86794 A   | 5/2015  |
| JP | 2015-145663    | 8/2015  |
| JP | 2015-229978    | 12/2015 |
| JP | 2016-74380 A   | 5/2016  |

* cited by examiner

EXHAUST HEAT RECOVERY SYSTEM

CROSS-REFERENCE TO RELATED APPLICATION

This application claims priority under 35 USC 119 from Japanese Patent Application No. 2016-113693 filed on Jun. 7, 2016, the disclosure of which is incorporated by reference herein in its entirety.

BACKGROUND

Technical Field

The technology of the present application relates to an exhaust heat recovery system.

Related Art

There are technologies that use exhaust heat from an engine to raise the temperature of engine coolant. For example, Japanese Patent Application Laid-open (JP-A) No. 2015-145663 discloses a technology that recovers, by means of an exhaust heat recovery unit disposed in an exhaust pipe, heat from exhaust gas and utilizes the heat for space heating and to promote the warmup of the engine, with the technology adjusting the recovery amount of the exhaust heat on the basis of a travel history in order to prevent or control freezing inside the exhaust pipe.

Specifically, JP-A No. 2015-145663 discloses a structure where a bypass path that bypasses the exhaust heat recovery unit is disposed in a coolant circulation path, so that the structure has a circulation flow path that passes through the exhaust heat recovery unit and a circulation flow path that does not pass through the exhaust heat recovery unit. Additionally, by using a switching valve to switch between the two circulation flow paths, the amount of the coolant circulating to the exhaust heat recovery unit is adjusted and the recovery amount of the exhaust heat is adjusted. JP-A No. 2015-145663 discloses that, by controlling the opening degree of the switching valve, the switching valve may control whether or not to allow the coolant to flow to the exhaust heat recovery unit and may control the flow rate of the coolant flowing to the exhaust heat recovery unit.

Furthermore, JP-A No. 2015-145663 discloses that the coolant is circulated by a water pump to the exhaust heat recovery unit, and the flow rate of the coolant flowing to the exhaust heat recovery unit is adjusted by controlling the water pump.

SUMMARY

In the technology described above, the amount of heat recovered from the exhaust heat recovery unit is adjusted by adjusting the opening degree of the switching valve and controlling the pump. That is, the amount of the coolant flowing to the exhaust heat recovery unit is adjusted, but there is room for improvement in order to realize, in a shorter amount of time and with a simpler configuration, adjustment of the recovery amount of the exhaust heat.

One aspect of the technology of the present application can adjust, in a shorter amount of time and with a simpler configuration, the recovery amount of exhaust heat from an engine.

A first aspect of the technology of the present application is an exhaust heat recovery system including: an exhaust heat recovery unit that is disposed in an exhaust pipe through which exhaust from an engine flows, the exhaust heat recovery unit recovering heat of the exhaust; a distribution flow path that is equipped with an upstream flow path through which engine coolant flows from the exhaust heat recovery unit to the engine and a downstream flow path through which the engine coolant flows from the engine to the exhaust heat recovery unit, the distribution flow path allowing the engine coolant to circulate between the exhaust heat recovery unit and the engine; a bypass flow path that communicates the upstream flow path to the downstream flow path in the distribution flow path and forms a short flow path by which the engine coolant that has exited the exhaust heat recovery unit returns to the exhaust heat recovery unit by way of a shorter flow path length than in a case where the engine coolant that has exited the exhaust heat recovery unit returns to the exhaust heat recovery unit via the engine; a valve that is disposed in the distribution flow path and adjusts an amount of the engine coolant flowing to the bypass flow path; and a pump that is disposed in the short flow path.

In this exhaust heat recovery system, the short flow path is formed by disposing the bypass flow path. The flow path length of the short flow path is shorter than the flow path length in a case where the engine coolant that has exited the exhaust heat recovery unit passes through the engine and returns to the exhaust heat recovery unit. That is, in a case where the engine coolant flows through the short flow path, the amount of the engine coolant circulating through the exhaust heat recovery unit decreases and the coolant temperature rises in a shorter amount of time than in a case where the engine coolant passes through the engine. Additionally, it is difficult for the heat to move from the exhaust heat recovery unit to the engine coolant whose coolant temperature has risen. The amount of the engine coolant flowing to the bypass flow path can be adjusted by the valve, so the amount of the engine coolant circulating through the short flow path can also be adjusted and the recovery amount recovered by the exhaust heat recovery unit can be adjusted. In particular, the pump is disposed in the short flow path, so the amount of the exhaust heat recovered from the engine can be adjusted by driving the pump to promote the circulation of the engine coolant in the short flow path and to adjust the flow speed of the engine coolant circulating through the short flow path. Moreover, by disposing the valve and the pump, the recovery amount of the exhaust heat can be adjusted, so the configuration is simple.

In a second aspect of the technology of the present application, the pump is placed between an upstream branching portion where the bypass flow path branches in the upstream flow path and the exhaust heat recovery unit.

The exhaust heat recovery system has a structure where the pump is used both in the case of causing the engine coolant to flow to the engine and in the case of causing the engine coolant to flow to the bypass flow path, so its configuration is simpler than one where pumps are disposed in correspondence to each case.

In a third aspect of the technology of the present application, an upstream branching portion where the bypass flow path branches in the upstream flow path branches in a position closer to the exhaust heat recovery unit than the engine.

The flow path length from the exhaust heat recovery unit to the upstream branching portion is shorter than it is in a structure where the upstream branching portion is in a position close to the engine in the upstream flow path. For this reason, after the valve is switched so that the engine coolant flows through the bypass flow path, the engine coolant can flow to the bypass flow path in a shorter amount of time.

In a fourth aspect of the technology of the present application, the valve is placed between an upstream branching portion where the bypass flow path branches in the upstream flow path and the engine.

The valve is placed between the upstream branching portion and the engine, so even in a case where the opening degree of the valve has been reduced, the flow path cross-sectional area of the short flow path is not affected and the flow rate of the engine coolant flowing through the short flow path can be ensured.

The technology of the present application is given the configurations described above, so the heat recovery amount of the exhaust heat of the engine can be adjusted in a shorter amount of time and with a simpler configuration.

BRIEF DESCRIPTION OF THE DRAWINGS

An exemplary embodiment of the present application will be described in detail based on the following figures, wherein.

DETAILED DESCRIPTION

An exhaust heat recovery system 12 of an embodiment of the technology of the present disclosure will now be described with reference to the drawings.

Figure 1:
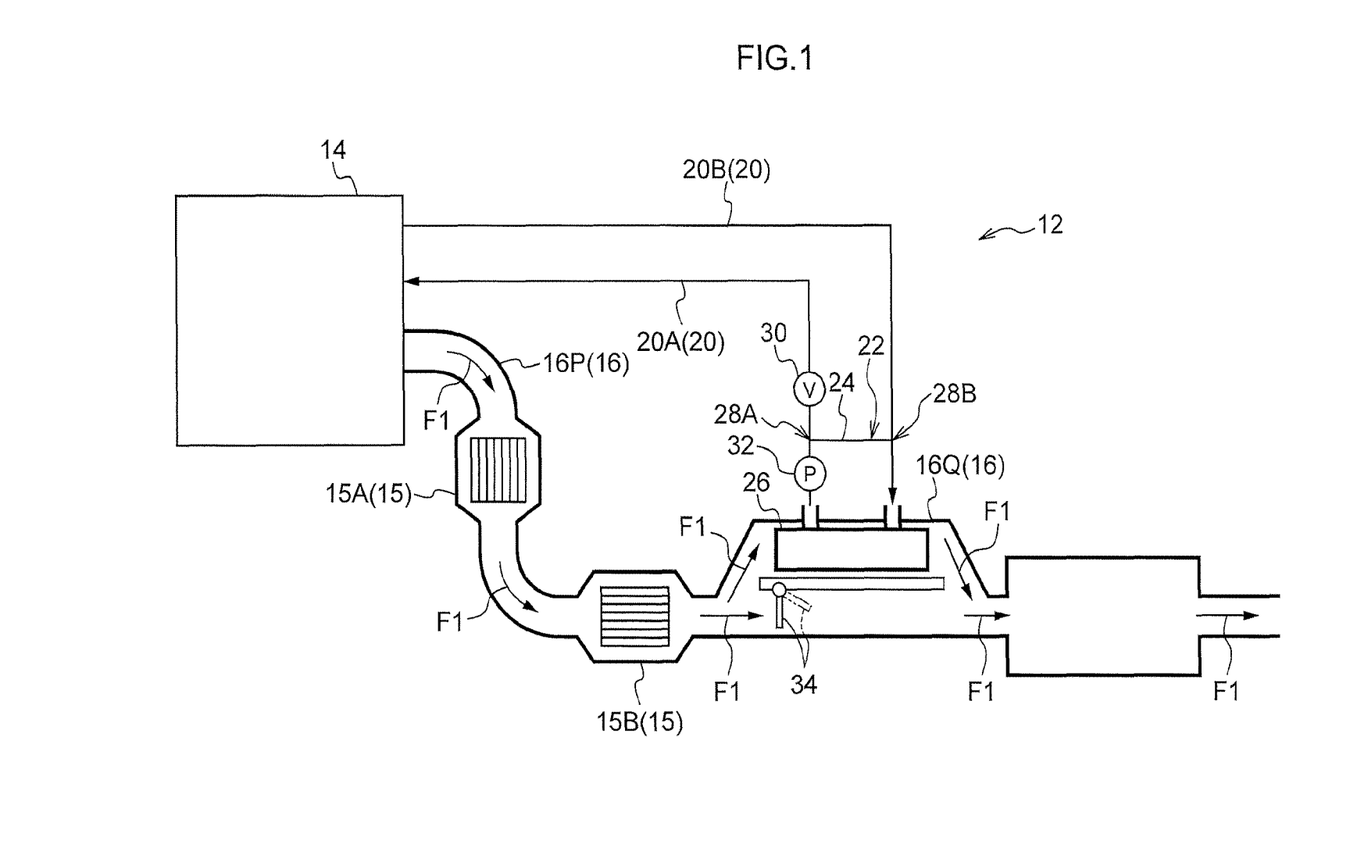
FIG. 1 is a schematic configuration diagram showing an exhaust heat recovery system of the embodiment.

As shown in FIG. 1, the exhaust heat recovery system 12 has an exhaust pipe 16 through which exhaust from an engine 14 flows. When the expressions "front" and "rear" are simply used in the following description, these will mean "front" and "rear" in the flow direction (the direction of arrow F1) of the exhaust, with the upstream of the flow of the exhaust being "front" and the downstream being "rear."

The exhaust pipe 16 has a first pipe 16P and a second pipe 16Q. One or plural catalytic converters 15 that remove specific components in the exhaust are disposed in the first pipe 16P. In the example shown in FIG. 1, two catalytic converters 15A and 15B are placed in series along the flow direction of the exhaust.

The second pipe 16Q branches from the first pipe 16P on the rear side of the catalytic converter 15B. An exhaust heat recovery unit 26 is disposed inside the second pipe 16Q. The second pipe 16Q merges with the first pipe 16P on the rear side of the exhaust heat recovery unit 26.

A valve member 34 is disposed in the first pipe 16P on the rear side of the position where the second pipe 16Q branches. The valve member 34 is controlled by an actuator, for example, and moves between a closed position indicated by the solid line and an open position indicated by the long dashed double-short dashed line. Because of this, in the closed position the valve member 34 reduces the flow path cross-sectional area of the first pipe 16P (it is not necessary for the valve member 34 to completely close off the first pipe 16P), so most of the exhaust flows to the second pipe 16Q. In contrast to this, in the open position the valve member 34 increases the flow path cross-sectional area of the first pipe 16P, so the amount of the exhaust flowing to the second pipe 16Q decreases from what it is when the valve member 34 is in the closed position.

A distribution flow path 20 is disposed between the engine 14 and the exhaust heat recovery unit 26. The distribution flow path 20 includes an upstream flow path 20A, through which engine coolant flows from the exhaust heat recovery unit 26 to the engine 14, and a downstream flow path 20B, through which the engine coolant flows from the engine 14 to the exhaust heat recovery unit 26. That is, a flow path is configured by which the engine coolant that has exited the exhaust heat recovery unit 26 flows through the upstream flow path 20A to the engine 14 and flows from the engine 14 through the downstream flow path 20B to circulate back to the exhaust heat recovery unit 26.

A bypass flow path 24 is disposed between the upstream flow path 20A and the downstream flow path 20B. The bypass flow path 24 communicates the upstream flow path 20A to the downstream flow path 20B. The bypass flow path 24 branches from the upstream flow path 20A at an upstream branching portion 28A and branches from the downstream flow path 28B at a downstream branching portion 28B. As described later, regarding the engine coolant that has exited from the exhaust heat recovery unit 26 to the upstream flow path 20A, the amount of the engine coolant flowing from the upstream branching portion 28A to the bypass flow path 24 can be adjusted by adjusting a valve 30. Additionally, the engine coolant that has flowed through the bypass flow path 24 merges with the downstream flow path 20B by means of the downstream branching portion 28B and returns to the exhaust heat recovery unit 26. Consequently, focusing on the flow of the engine coolant, the upstream branching portion 28A is a branching portion where the engine coolant flowing through the upstream flow path 20A branches to the bypass flow path 24. Similarly, the downstream branching portion 28B is a merging portion where the engine coolant that has flowed through the bypass flow path 24 merges with the downstream flow path 20B.

A short flow path 22 is formed by the section of the upstream flow path 20A from the exhaust heat recovery unit 26 to the upstream branching portion 28A, the bypass flow path 24, and the section of the downstream flow path 20B from the downstream branching portion 28B to the exhaust heat recovery unit 26. Considering the flow path through which the engine coolant circulates starting and ending at the exhaust heat recovery unit 26, this flow path includes two flow paths: the flow path that passes through the engine 14 and the flow path (the short flow path 22) that passes through the bypass flow path 24. The short flow path 22 does not pass through the engine 14, so its flow path length is shorter than that of the flow path that passes through the engine 14.

In this embodiment, the upstream branching portion 28A is in a position, in the upstream flow path 20A, relatively closer to the exhaust heat recovery unit 26 than the engine 14 (on the exhaust heat recovery unit 26 side of the middle of the upstream flow path 20A). Similarly, the downstream branching portion 28B is in a position, in the downstream flow path 20B, closer to the exhaust heat recovery unit 26 than the engine 14.

In the upstream flow path 20A, a valve 30 is disposed between the upstream branching portion 28A and the engine 14. The valve 30 can adjust the amount of the engine coolant flowing through the upstream flow path 20A. For example, when the valve 30 is completely closed, the engine coolant that has exited from the exhaust heat recovery unit 26 to the upstream flow path 20A no longer flows to the engine 14 but instead flows to the bypass flow path 24. In a case where the opening degree of the valve 30 has been made smaller than it is when the valve 30 is completely open, the amount of the engine coolant flowing to the engine 14 decreases and, instead, the amount of the engine coolant flowing to the bypass flow path 24 increases.

In the upstream flow path 20A, a pump 32 is disposed between the exhaust heat recovery unit 26 and the upstream branching portion 28A. The pump 32 can adjust the flow rate of the engine coolant by pressurizing the engine coolant flowing between the exhaust heat recovery unit 26 and the upstream branching portion 28A.

Figure 2:
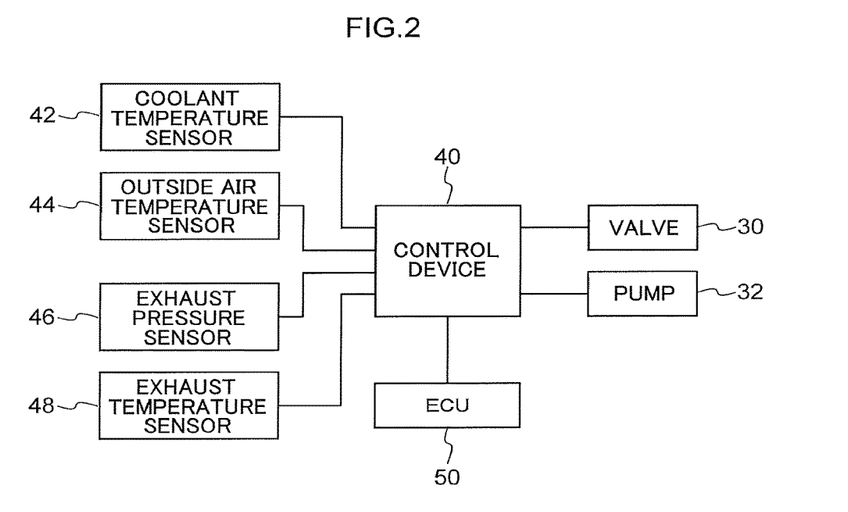
FIG. 2 is a block diagram showing the exhaust heat recovery system of the embodiment.

As shown in FIG. 2, the valve 30 and the pump 32 are controlled by a control device 40. In this embodiment, a coolant temperature sensor 42 that detects the temperature of the engine coolant, an outside air temperature sensor 44 that detects the outside air temperature, an exhaust pressure sensor 46 that detects the pressure of the exhaust, an exhaust temperature sensor 48 that detects the temperature of the exhaust, and an engine control unit (ECU) 50 are connected to the control device 40. Moreover, the control device 40 is configured to obtain, from various devices in the vehicle, data relating to the travel history of the vehicle (travel time, amount of exhaust, fuel consumption amount, etc.) and position information. The control device 40 can control the valve 30 and the pump 32 on the basis of the data obtained from these sensors and various devices.

Next, the action of the present embodiment will be described.

The heat of the exhaust from the engine 14 is recovered by the exhaust heat recovery unit 26 and is transmitted to the engine coolant. By raising the temperature of the engine coolant, for example, it is possible to promote the warmup of the engine 14 and to use the heat of the engine coolant for space heating.

Here, there are cases where it is desirable to reduce the amount of heat that is recovered from the exhaust by the exhaust heat recovery unit 26 (the amount of heat that is transmitted to the engine coolant). Such cases include, for example, a case where the temperature of the engine coolant has reached a predetermined temperature and it is not necessary to raise the temperature of the engine coolant beyond this predetermined temperature. Furthermore, such cases also include a case where it is desirable to keep the temperature of the exhaust flowing through the inside of the exhaust pipe 16 from dropping to thereby control freezing inside the exhaust pipe 16.

In this case, the control device 40 can reduce the amount of heat recovered by the exhaust heat recovery unit 26 by controlling the valve 30 and the pump 32. Below, control performed by the control device 40 with respect to the valve 30 and the pump 32 in order to reduce the amount of heat recovered by the exhaust heat recovery unit 26 will be called "recovery amount reduction control."

Specifically, the control device 40 reduces the opening degree of the valve 30 and drives the pump 32 as the recovery amount reduction control.

Figure 4:
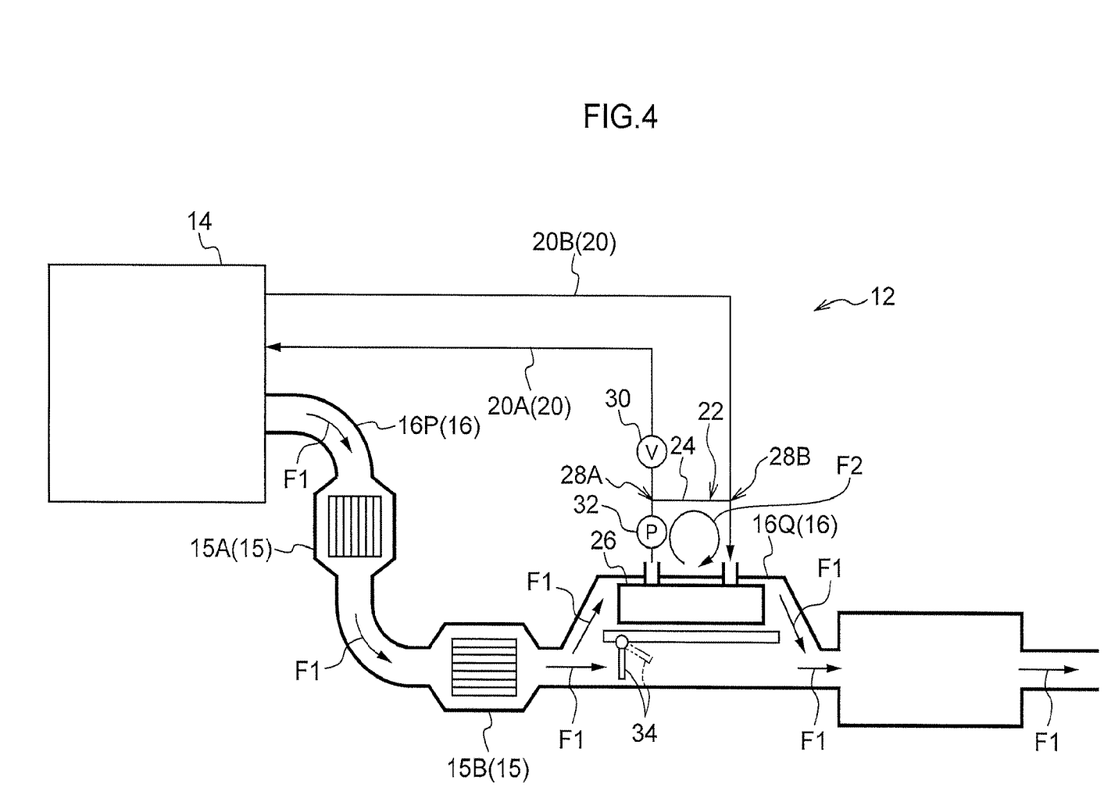
FIG. 4 is a schematic configuration diagram showing the exhaust heat recovery system of the embodiment.

Because of this, as shown in FIG. 4, of the engine coolant that has exited from the exhaust heat recovery unit 26 to the upstream flow path 20A, the amount of the engine coolant moving from the upstream branching portion 28A to the bypass flow path 24 increases. The engine coolant that has flowed through the bypass flow path 24 returns from the downstream branching portion 28B via the downstream flow path 20B to the exhaust heat recovery unit 26. That is, the engine coolant flows through the short flow path 22 as indicated by arrow F2. The short flow path 22 has a shorter flow path length than in the case of passing through the engine 14, so the amount of the engine coolant circulating at the position of the exhaust heat recovery unit 26 also decreases. Because of this, the temperature of the engine coolant that has received the heat of the exhaust heat recovery unit 26 rises in a short amount of time. More heat moves from the exhaust heat recovery unit 26 to the engine coolant the greater the temperature difference between them is. Consequently, the amount of heat transmitted from the exhaust heat recovery unit 26 to the engine coolant whose temperature has risen decreases. Furthermore, when the amount of heat transmitted from the engine heat recovery unit 26 to the engine coolant decreases, the temperature of the exhaust on the downstream side of the exhaust heat recovery unit 26 becomes higher. For this reason, freezing of the exhaust pipe 16 on the downstream side of the exhaust heat recovery unit 26 can be controlled.

Examples of determination factors for whether or not to perform the recovery amount reduction control and purposes (aims) of the recovery amount reduction control can include those shown in Table 1 below.

TABLE 1

| Determination Factors | Purposes (Aims) |
| --- | --- |
| Temperature of engine coolant | Control excessive rise in temperature of engine coolant |
| Outside air temperature | Control freezing when freezing of exhaust pipe is predicted |
| Engine temperature history while engine is stopped | |
| Detection value of exhaust pressure | Unfreeze when exhaust pipe is frozen |
| Detection value of exhaust temperature | |
| Exhaust temperature prediction value in engine control device | |
| Detection value of surface temperature of exhaust pipe | |
| Travel history of previous travel and current travel (Travel time, maximum exhaust amount, fuel consumption amount, etc.) | Unfreeze when potential exists for exhaust pipe to be frozen after previous travel |
| Position information of vehicle | Control freezing when vehicle is in geographical region where exhaust pipe easily freezes |

Figure 3:
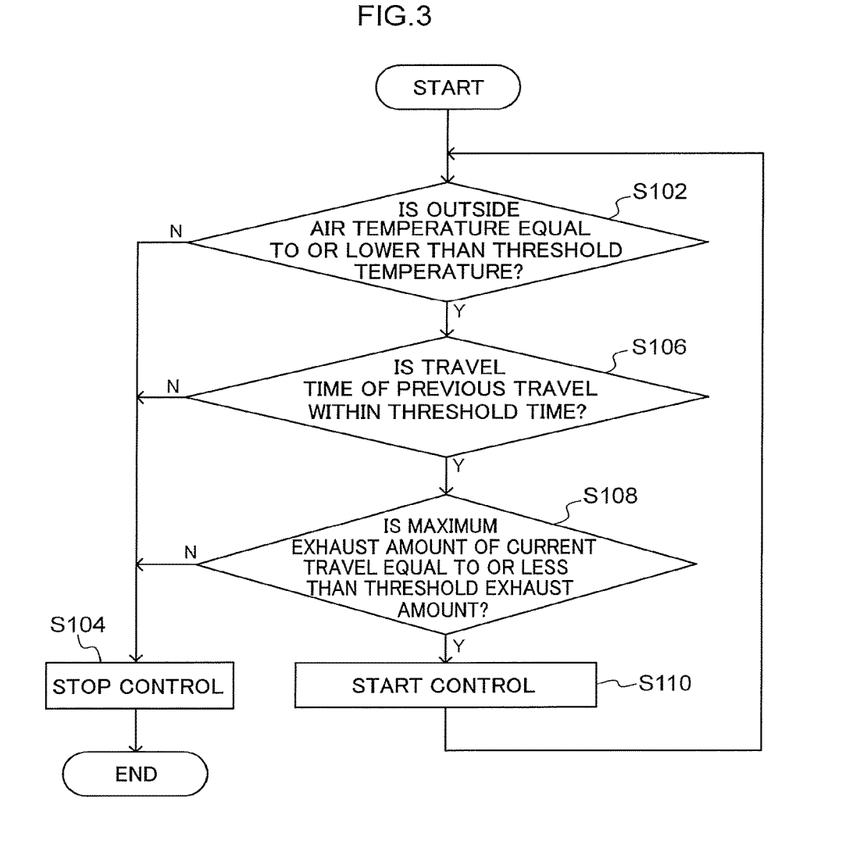
FIG. 3 is a flowchart of recovery amount reduction control in the exhaust heat recovery system of the embodiment.

Examples of the actual recovery amount reduction control in the control device 40 can include the one based on the flowchart shown in FIG. 3.

In this flow, the control device 40 judges in step S102 whether or not the outside air temperature is equal to or lower than a preset threshold temperature. The threshold temperature is a threshold temperature at which the control device 40 judges that the potential for freezing to occur inside the exhaust pipe 16 is high. The threshold temperature is, for example, 0° C. In a case where the judgment in step S102 is NO, the control device 40 moves to step S104.

In step S104, the control device 40 performs control (stops control) to stop the recovery amount reduction control with respect to the valve 30 and the pump 32. "Stops control" here includes both stopping the recovery amount reduction control in a case where the recovery amount reduction control is already being performed and, in a case where the recovery amount reduction control is not being performed, continuing the state in which the recovery amount reduction control is not being performed.

The control device 40 moves to step S106 in a case where the judgment in step S102 is YES. In step S106, the control device 40 judges whether or not the travel time in the previous travel of the vehicle is within a preset threshold time. The threshold time is a threshold vehicle travel time at which the control device 40 judges that the potential for freezing to occur inside the exhaust pipe 16 is high. The threshold time is, for example, 10 minutes. The control device 40 moves to step S104 in a case where the judgment in step S106 is NO and moves to step 108 in a case where the judgment in step S106 is YES.

In step S108, the control device 40 judges whether or not the maximum exhaust amount in the current travel is equal to or less than a preset threshold exhaust amount. The exhaust amount referred to here is the amount of exhaust exhausted from the engine 14 per unit time. Additionally, the threshold exhaust amount is a threshold exhaust amount at which the control device 40 judges that the potential for freezing to occur inside the exhaust pipe 16 is high. The control device 40 moves to step S104 in a case where the judgment in step S108 is NO and moves to step S110 in a case where the judgment in step S108 is YES. In step S110, the control device 40 performs the recovery amount reduction control. Then, the control device 40 returns to step S102.

In this way, in a case where the judgments in steps S102, S106, and S108 in the flow shown in FIG. 3 are all YES, this means that the outside air temperature is equal to or lower than the threshold temperature, the travel time of the previous travel is within the predetermined time, and the maximum exhaust amount of the current travel is equal to or lower than the threshold exhaust amount. That is, in this case the potential for the exhaust pipe 16 to freeze is high. Therefore, the control device 40 performs the recovery amount reduction control in step S110 in order to prevent freezing of the exhaust pipe 16. In contrast to this, in a case where any of the judgments in steps S102, S106, and S108 is NO, the control device 40 stops the recovery amount reduction control in step S104 because the potential for the exhaust pipe 16 to freeze is low.

In this way, by using plural determination factors to determine whether or not to perform the recovery amount reduction control, a case where freezing of the exhaust pipe 16 is supposed can be accurately ascertained to control the recovery amount of the exhaust heat in the exhaust heat recovery unit 26.

In the embodiment, the actuator that controls the opening and closing of the valve member 34 is not particularly limited. For example, a coolant temperature sensing thermo-actuator that controls the opening and closing of the valve member 34 on the basis of the temperature of the engine coolant can be used. When a coolant temperature sensing thermo-actuator is used, in the case of performing the recovery amount reduction control the temperature of the engine coolant can be raised in a short amount of time by allowing a lot of exhaust to flow to the second pipe 16Q at the initial stage of control on the basis of the temperature of the engine coolant. Additionally, by raising the temperature of the engine coolant in a short amount of time, it is possible to move at an early stage to the recovery amount reduction control because of the control device 40.

In the embodiment, the pump 32 is disposed in the upstream flow path 20A and in particular is placed between the exhaust heat recovery unit 26 and the upstream branching portion 28A. Instead of this, even in a configuration where the pump 32 is disposed in the bypass flow path 24, for example, the engine coolant flowing through the short flow path 22 can be pressurized to promote the circulation of the engine coolant because the bypass flow path 24 is part of the short flow path 22. In particular, the section from the exhaust heat recovery unit 26 to the upstream branching portion 28A is also the flow path through which flows the engine coolant flowing to the engine 14 in a state in which the valve 30 is open. That is, by disposing the pump 32 in the section from the exhaust heat recovery unit 26 to the upstream branching portion 28A, the pump 32 can be used both in the case of causing the engine coolant to flow to the engine 14 and in the case of causing the engine coolant to flow to the bypass flow path 24. Consequently, the configuration is simpler than one where pumps are disposed separately in these cases.

It should be noted that, from the standpoint of using the pump 32 both in the case of causing the engine coolant to flow to the engine 14 and in the case of causing the engine coolant to flow to the bypass flow path 24, the pump 32 may also be disposed in the downstream flow path 20B between the downstream branching portion 28B and the exhaust heat recovery unit 26. By disposing the pump 32 in the upstream flow path 20A, the engine coolant immediately after it has exited the exhaust heat recovery unit 26 can be pressurized, so the circulation of the engine coolant can be effectively promoted.

The upstream branching portion 28A is in a position, in the upstream flow path 20A, relatively close to the exhaust heat recovery unit 26 rather than a position close to the engine 14. Consequently, the short flow path 22 can be made shorter than it is in a structure where the upstream branching portion 28A is in a position close to the engine 14. Similarly, the downstream branching portion 28B is in a position, in the downstream flow path 20B, relatively close to the exhaust heat recovery unit 26 rather than a position close to the engine 14. Consequently, the short flow path 22 can be made shorter than it is in a structure where the downstream branching portion 28B is in a position close to the engine 14.

The valve 30 is placed in the upstream flow path 20A between the upstream branching portion 28A and the engine 14. That is, the valve 30 is in a position that avoids the short flow path 22. Consequently, even in a case where the opening degree of the valve 30 has been reduced or a case where the valve 30 has been completely closed, the flow path cross-sectional area of the short flow path 22 does not become smaller and an amount of engine coolant flowing through the short flow path 22 can be ensured.

It should be noted that although an example where the valve 30 is placed in the upstream flow path 20A is described above, instead of this the valve 30 may also be placed in the downstream flow path 20B (between the downstream branching portion 28B and the engine 14). Furthermore, for example, the valve 30 may also be a three-way valve placed in the upstream branching portion 28A or the downstream branching portion 28B.

The disclosure of Japanese Patent Application No. 2016-113693 filed on Jun. 7, 2016, is incorporated by reference herein in its entirety.

All documents, patent applications, and technical standards mentioned in this specification are incorporated by reference herein to the same extent as if each individual document, patent application, and technical standard were specifically and individually indicated to be incorporated by reference.

What is claimed is:

1. An exhaust heat recovery system comprising:
an exhaust heat recovery unit that is disposed in an exhaust pipe through which exhaust from an engine flows, the exhaust heat recovery unit recovering heat of the exhaust;
a distribution flow path that is equipped with an upstream flow path through which engine coolant flows from the exhaust heat recovery unit to the engine and a downstream flow path through which the engine coolant flows from the engine to the exhaust heat recovery unit, the distribution flow path allowing the engine coolant to circulate between the exhaust heat recovery unit and the engine;
a bypass flow path that communicates the upstream flow path to the downstream flow path in the distribution flow path and forms a short flow path by which the engine coolant that has exited the exhaust heat recovery unit returns to the exhaust heat recovery unit by way of a shorter flow path length than in a case where the engine coolant that has exited the exhaust heat recovery unit returns to the exhaust heat recovery unit via the engine;
a valve that is disposed in the distribution flow path and adjusts an amount of the engine coolant flowing to the bypass flow path; and
a pump that is disposed in the short flow path apart from the bypass flow path.

2. The exhaust heat recovery system according to claim 1, wherein the pump is placed between an upstream branching portion where the bypass flow path branches in the upstream flow path and the exhaust heat recovery unit.

3. The exhaust heat recovery system according to claim 1, wherein an upstream branching portion where the bypass flow path branches in the upstream flow path branches in a position closer to the exhaust heat recovery unit than the engine.

4. The exhaust heat recovery system according to claim 1, wherein a downstream branching portion where the bypass flow path branches in the downstream flow path branches in a position closer to the exhaust heat recovery unit than the engine.

5. The exhaust heat recovery system according to claim 1, wherein the valve is placed between an upstream branching portion where the bypass flow path branches in the upstream flow path and the engine.

6. The exhaust heat recovery system according to claim 1, further comprising a control device that adjusts an opening degree of the valve.

7. The exhaust heat recovery system according to claim 6, wherein, in a case of reducing an amount of heat recovered by the exhaust heat recovery unit, the control device reduces the opening degree of the valve.

8. An exhaust heat recovery system comprising:
an exhaust heat recovery unit that is disposed in an exhaust pipe through which exhaust from an engine flows, the exhaust heat recovery unit recovering heat of the exhaust;
a distribution flow path that is equipped with an upstream flow path through which engine coolant flows from the exhaust heat recovery unit to the engine and a downstream flow path through which the engine coolant flows from the engine to the exhaust heat recovery unit, the distribution flow path allowing the engine coolant to circulate between the exhaust heat recovery unit and the engine;
a bypass flow path that communicates the upstream flow path to the downstream flow path in the distribution flow path and forms a short flow path by which the engine coolant that has exited the exhaust heat recovery unit returns to the exhaust heat recovery unit by way of a shorter flow path length than in a case where the engine coolant that has exited the exhaust heat recovery unit returns to the exhaust heat recovery unit via the engine;
a valve that is disposed in the distribution flow path and adjusts an amount of the engine coolant flowing to the bypass flow path; and
a pump that is disposed in the short flow path,
wherein an upstream branching portion where the bypass flow path branches in the upstream flow path branches in a position closer to the exhaust heat recovery unit than the engine.

9. An exhaust heat recovery system comprising:
an exhaust heat recovery unit that is disposed in an exhaust pipe through which exhaust from an engine flows, the exhaust heat recovery unit recovering heat of the exhaust;
a distribution flow path that is equipped with an upstream flow path through which engine coolant flows from the exhaust heat recovery unit to the engine and a downstream flow path through which the engine coolant flows from the engine to the exhaust heat recovery unit, the distribution flow path allowing the engine coolant to circulate between the exhaust heat recovery unit and the engine;
a bypass flow path that communicates the upstream flow path to the downstream flow path in the distribution flow path and forms a short flow path by which the engine coolant that has exited the exhaust heat recovery unit returns to the exhaust heat recovery unit by way of a shorter flow path length than in a case where the engine coolant that has exited the exhaust heat recovery unit returns to the exhaust heat recovery unit via the engine;
a valve that is disposed in the distribution flow path and adjusts an amount of the engine coolant flowing to the bypass flow path; and
a pump that is disposed in the short flow path,
wherein a downstream branching portion where the bypass flow path branches in the downstream flow path branches in a position closer to the exhaust heat recovery unit than the engine.

* * * * *